United States Patent [19]

Davis et al.

[11] Patent Number: 4,662,002
[45] Date of Patent: Apr. 28, 1987

[54] OPTICAL REPEATERS

[75] Inventors: Arthur A. Davis, Harrold Wood; Robert W. Eady, London, both of England

[73] Assignee: Standard Telephones and Cables Public Limited Company, London, England

[21] Appl. No.: 690,535

[22] Filed: Jan. 11, 1985

[30] Foreign Application Priority Data

Jan. 19, 1984 [GB] United Kingdom ............... 8401433

[51] Int. Cl.$^4$ .................................................. H04B 9/00
[52] U.S. Cl. ................... 455/601; 174/70 S; 350/96.20
[58] Field of Search ............. 455/601, 7, 90, 612; 375/3, 4; 250/551; 350/96.20, 96.21, 96.22; 174/70 S

[56] References Cited

U.S. PATENT DOCUMENTS 3,700,900 10/1972 Herleikson ...................... 455/601
4,253,729 3/1981 Rocton ............................ 174/70 S
4,505,540 3/1985 Furusawa et al. ................ 174/70 S

FOREIGN PATENT DOCUMENTS 0141503 11/1979 Japan ............................. 455/601
0057347 5/1981 Japan ............................. 455/601
0154839 11/1981 Japan ............................. 455/601
720243 12/1954 United Kingdom .
815837 7/1959 United Kingdom .

OTHER PUBLICATIONS

Runge et al.; "Future Undersea Lightwave Communications System;" *Signal;* Jun. 83; pp. 30-35.
Mayauchi et al.; "Considerations on Undersea Optical Transmission System;" *Conference:* 1981 *International Conference on Communcations;* Denver, Co., 14-18, Jun. 81; pp. 163.1-163.5.

*Primary Examiner*—Joseph A. Orsino, Jr.
*Attorney, Agent, or Firm*—Kerkam, Stowell, Kondracki & Clarke

[57] ABSTRACT

In a digital optical submersible repeater the electronic and opto-electronic components are housed in an hermetically sealed modular assembly (20, 60, 70) of a first regenerator module (20) for one fibre (7, 6a), a second regenerator module (60) for the second fibre (6, 7a) of the pair of fibres, and a power module (70) for extracting power from the power feed conductor of the cable. In each regenerator module (20) the transmit laser (8) and the receive PINFET diode are on diametrically opposed faces, and power feed and optical signal feed are disposed in spaces between the modules and the inside surface of the repeater housing (1). The modular assembly is resiliently secured to the bulkhead (2).

2 Claims, 10 Drawing Figures

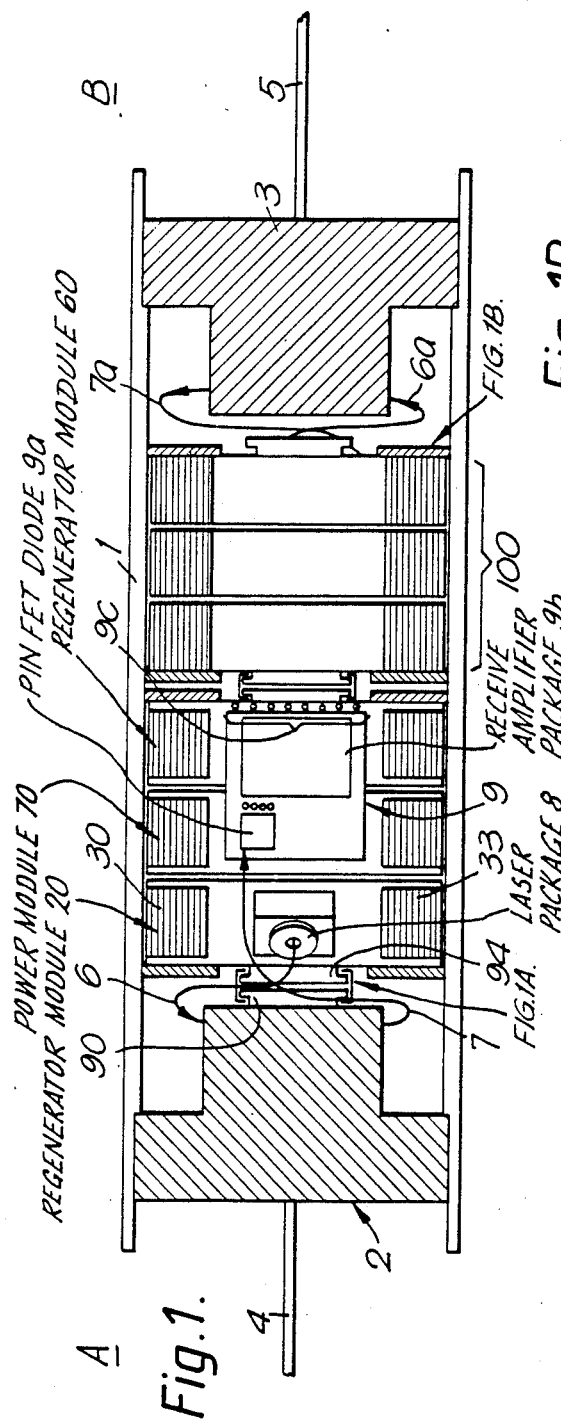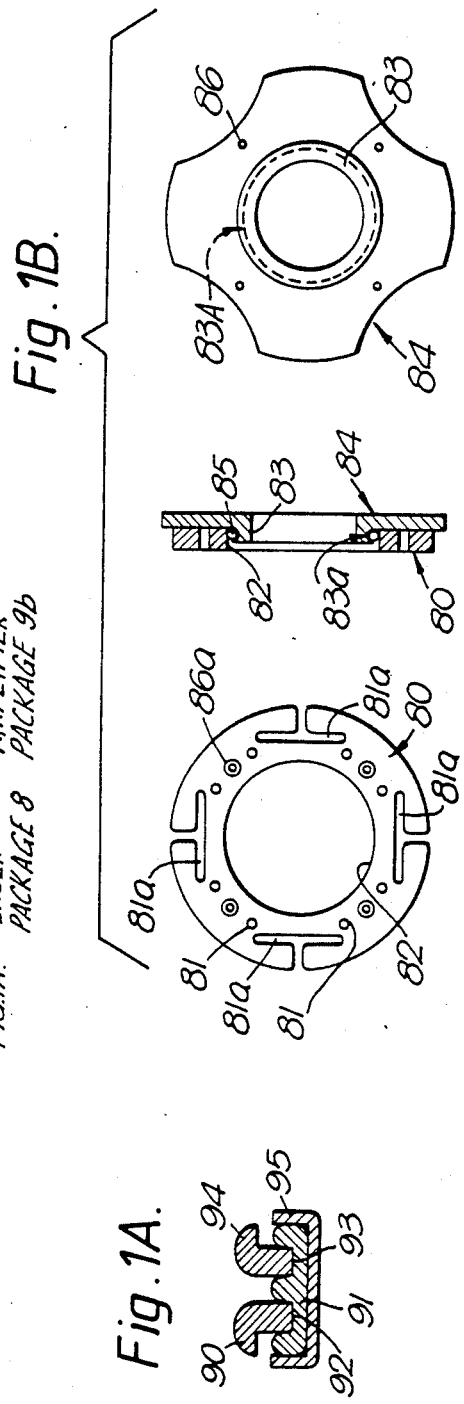

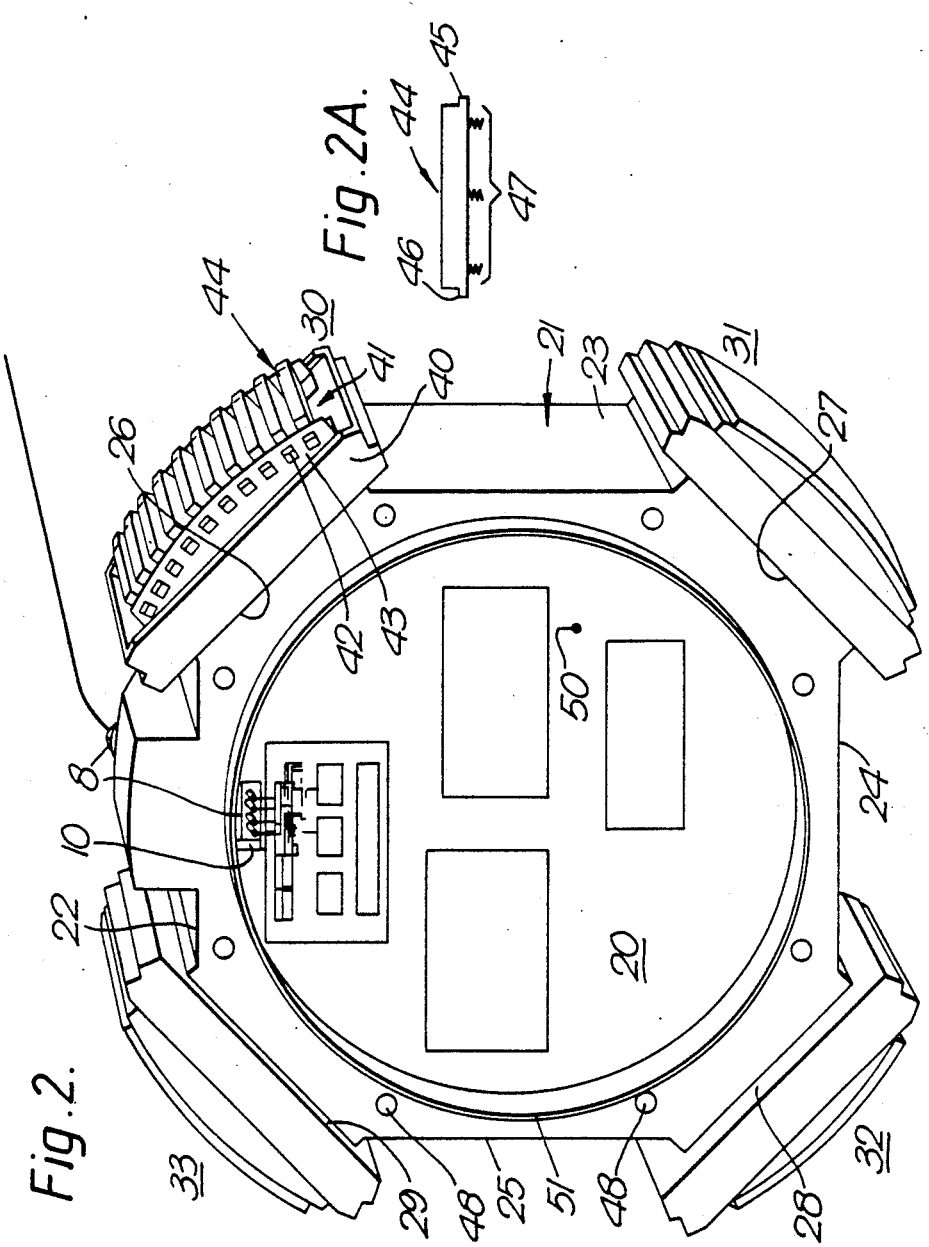

OPTICAL REPEATERS

BACKGROUND OF THE INVENTION

This invention relates to repeaters for regenerating the signal in a digital undersea transmission system.

With the advent of high speed digital optical systems it is important to ensure that the opto-electronic components are adequately protected from the hostile underwater environment. It is important to prevent ingress of gas and moisture and to maintain adequate screening between channels in the repeater.

DISCUSSION OF THE PRIOR ART

Applicant's British Patent Specification No. 815837 discloses a joint between electric cables and superficially is similar to a modern submarine telecommunications link insofar as the repeater of the link acts as a joint between the adjacent cable portions of the link. It discloses sealed loading coil cans (1) but otherwise the components are not sealed and the constructional arrangement does not lend itself to flexibility of requirements in system design.

It is an object of the present invention to provide a constructional arrangement which lends itself to good screening, hermetic sealing and flexibility of requirements in system design.

SUMMARY OF THE INVENTION

According to the present invention there is provided a digital repeater for an optical transmission system comprising an outer sealed housing and, for each fibre pair in the system, two independently-sealed regenerator modules having electronic and opto-electronic components for regenerating the signal in each fibre, there being a further independently sealed power module arranged to provide a power feed for each regenerator module.

According to another aspect of the present invention there is provided a digital repeater for an optical transmission system comprising an outer housing having an internal surface, a modular assembly within the housing, electronic and opto-electronic components carried by the modular assembly said assembly being hermetically sealed, spaces defined between the assembly and the internal surface of the housing, and optical conductors disposed in said spaces for carrying optical signals to and from the opto-electronic components of the assembly.

According to a further aspect of the present invention there is provided an optical repeater for a submerged optical transmission system comprising a tubular pressure resistant housing, a pressure resistant bulkhead at each end removably secured to the housing, a pressure resistant cable gland removably secured in each bulkhead, and a chassis located inside the housing, the chassis being electrically and optically connected to both cables in the cable glands and being physically connected to one of the bulkheads, there being optical feeds means and power feed means between the chassis and the cable in the other bulkhead, said feed means being held in a resilient helically-coiled member whereby the bulkhead and attached chassis can be withdrawn from the one end while the power and optical feed integrity is maintained at the other end.

According to yet another aspect of the present invention there is provided an optical repeater for a submerged optical transmission system comprising a tubular pressure resistant housing, opto electronic components in the housing, a pressure resistant bulkhead removably secured to the housing, a gland removably secured in the bulkhead, and a tail cable sealed in the gland there being optical fibres connected between the cable on the one hand and the opto-electronic components of the repeater on the other hand, and a resiliant coiled carrier carrying the optical fibres whereby the gland can be removed from or assembled into the bulkhead, the carrier stretching or closing like a spring during these manouevers.

BRIEF DESCRIPTION OF THE DRAWINGS

In order that the invention can be clearly understood reference will now be made to the accompanying drawings in which FIG. 1 shows part of an optical repeater according to on embodiment of the present invention;

FIGS. 1A and 1B show details of FIG. 1, not necessarily on the same scale;

FIG. 2 shows in perspective part of FIG. 1 on an enlarged scale;

FIG. 2A shows a detail of FIG. 2.

DESCRIPTION OF THE PREFERRED EMBODIMENTS

Figure 3:
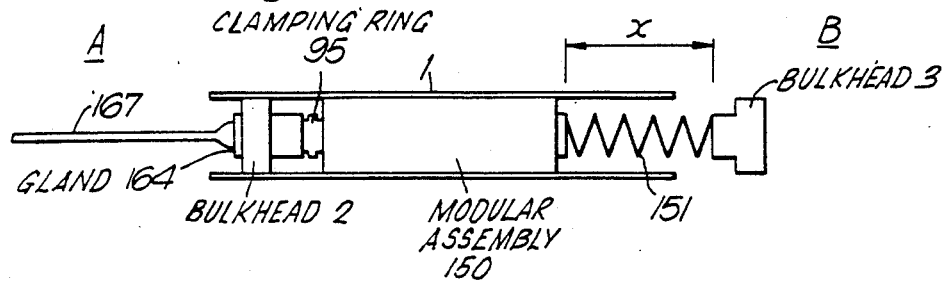
FIG. 3 shows schematically part of the assembly procedure.

Referring to FIG. 1 the undersea repeater comprises a pressure resistant metal housing 1 made of steel sealed by bulkheads 2 and 3 at each end. Through the bulkheads are sealed and secured respective fibre optic cables 4 and 5 which also have a power conductor e.g. 4a (FIG. 3A) for providing electrical power to the repeater to power the circuitry. The technique by which the cable, power conductor and fibres are sealed through the bulkhead together with other aspects of the repeater are described in our co-pending British Patent Application Nos. 2058484, 8401447 and 8401432.

The bulkheads 2 and 3 each contain a sealed chamber (not shown), in which the optical fibres 6 and 7 are spliced and the fibres extend from the chamber on a carrier 161 (FIG. 5) through the bulkhead radially or radially and circumferentially and follow a gently curved path into a longitudinal direction towards the semiconductor injection laser in its package 8 and the PIN FET diode 9a and receive amplifier package 9b in an assembly 9. Both packages and assemblies are hermetically sealed. The laser package 8 is sealed into an aperture 10 inclined towards the longitudinal axis of the repeater and more easily seen in FIG. 2, and the assembly 9 has interconnection leads 9c extending between the receive amplifier package 9b and casing 21, and hermetically sealed in both.

Referring to FIG. 2 there is shown a transmit and receive module 20 comprising a metal casing 21 having eight sides around its circumference. Four of the sides 22, 23, 24 and 25 provide for electrical and optical connections, either interconnections between this module and the adjacent or co-operating module, or input and output power and optical signal connections to and from the sea cable 4 or 5. The other four sides 26, 27, 28 and 29 support electrically insulating thermally conductive resilient heat transfer devices 30, 31, 32 and 33 which provide a good heat transfer path between the module and the metal housing 1.

Each heat transfer device such as 30 comprises a box-like part 40 made of heat conductive electrically insulating material such as alumina, the underside of part 40 being secured e.g. by heat-conductive glue, to face 26. Inside the box-like part 40 is seated a channel shaped part 41 of brass with slots 42 in the side walls 43 of the channel 41. The part 41 is in good heat transfer connection with the base of box 40. A number of transverse metal slats such as 44 have two lugs 45 and 46 which locate in the opposed slot 42 and metal springs 47 urge the slats 44 outwards. The surface of the slats 44 will bear against the inside surface of the housing 1 when the module is located in the housing 1, slightly compressing the springs 47.

The function of the heat transfer devices such as 30 is to ensure that the temperature of the electronic components and particularly the laser diode rises as little as possible above the ambient temperature of the repeater housing 1 which on the seabed will normally be close to 4° C. except in tropical areas or where strong currents flow. The heat transfer devices are more fully described in our co-pending British Patent application No. 8401432.

The interior of the casing 21 is divided into two regions by an integral wall 50. Thus on the side of the module 20 hidden from view is a circular chamber corresponding to the one which is visible but over twice as deep. The visible chamber houses the transmit circuitry; the hidden chamber houses the receive circuitry and supervisory circuitry. The integral wall ensures good screening between the transmit and receive parts of the circuitry. The module is closed and sealed hermetically by welding or soldering a metal lid on each side to a rim such as 51 on the module casing 21 with an inert clean atmosphere locked inside.

On the face 24 of the module casing, diametrically opposite the laser package 8, will be mounted a PIN FET diode and receive amplifier assembly similar to the assembly 9 shown in FIG. 1. This will receive the signal from the direction B to A in fibre 7a and the laser package 8 transmits the regenerated signal in the same direction via fibre 6. The arrows on the fibre indicate the signal direction.

The regenerator module 60 shown in FIG. 1 is similar to module 20 in all respects except that it receives and transmits in the direction A to B via fibres 7 and 6a respectively and the supervisory circuit will respond to provide a loop back condition in response to a different signal compared with module 20.

In between the two modules 20 and 60 is a power module 70 which receives power from the cable 4 and zener diodes are used to pick off a voltage for powering the adjacent modules 20 and 60. In other respects the structure of module 70 is the same as 60 and 20.

The three modules 20, 60 and 70 are clamped together to form a modular assembly by bolts (not shown) passing through holes such as 48 (FIG. 2) and cylindrical spacers on the bolts and between the modules. At each end there is clamped (FIG. 1B) an insulating plastics plate 80 with holes 81 corresponding to holes 48. Plate 80 has an annular hole 82 which at one end (right hand) co-operates with an annular projection 83 on a second insulating plastics or glass fibre plate 84 to hold a resilient 'O' ring 85 between them. It also has slots 81a which are positioned in line with the spaces between the module sides 22,23,24,25 and the interior surface of the housing, to carry the optical fibre and power connection means. Projection 83 has an annular recess 83a in which the 'O' ring 85 partially sits. Screws secured in holes such as 86 in plate 84 locate in holes 86a in plate 80 to secure this plate to plate 80 but with freedom for limited radial but not axial relative movement between the plates against the resilience of the 'O' ring 85 and such that the resilient heat transfer devices are not damaged by overcompression during shock loading on the housing. The plate 84 is a sliding fit inside the repeater housing 1 whereas plate 80 has a smaller overall diameter, and the 'O' ring 85 acts as a resilient radial support for the modular assembly 20, 60, 70 at the right hand end. Further the assembly is locked to the end flange 90 of the bulkhead 2 by a rubber ring 91 having two internal grooves 92, 93 into which fit the peripheries of flange 90 and the flange 94 of module 20 (flange 94 is not shown in FIG. 2 but is secured to the casing 21). An annular metal clamping ring 95 is secured over the rubber ring 91 to resiliently lock the modular assembly to the bulkhead in an axial direction and in the radial direction.

The modular assembly described provides regeneration for a fibre pair in the cable 4 and 5 for both directions. A second modular assembly indicated generally by reference numeral 100 is similar to the one just described and provides regeneration for a second fibre pair in the cable. The two modular assemblies are locked together by a rubber ring 91 and clamp 95 in the same way as the first modular assembly is locked to the bulkhead 2 and as shown in FIG. 1A.

In the embodiment shown in FIG. 1 there are illustrated just two modular assemblies for two fibre pairs. In practice the repeater housing 1 could accommodate more such assemblies depending on the number of fibre pairs in the system and the length of the housing 1. In assembling the regenerator the left hand bulkhead 2 is pre-assembled with the modular assemblies joined together and then inserted into the housing. The right hand end is then completed by making the necessary splices between tail fibres and power feed connections, and the right hand bulkhead is then secured and sealed in place. In repairing a regenerator the left hand bulkhead can be removed complete with modular assemblies and there is enough coiled length in the fibres and power feed at the right-hand end to enable the left hand bulkhead with assemblies attached to be completely withdrawn.

The embodiment described has the advantage of three distinct levels of sealing the opto-electronics from the hostile environment of the ocean bed; there are two seals through the bulkhead and a further seal through the individual regenerator module or power module. A further advantage is the flexibility in design - an additional modular assembly can simply be added for each fibre pair of the system without the need to design a different regenerator for each system. It also has the distinct advantage of enabling individual pressure testing of each seal and of electrically and optically testing each module prior to assembly. The individual modules are inherently self screening so that electronics of each module are well screened from other modules.

The embodiment described also facilitates assembly and repair and in particular splices between the sea cable and the repeater.

Figure 3A:
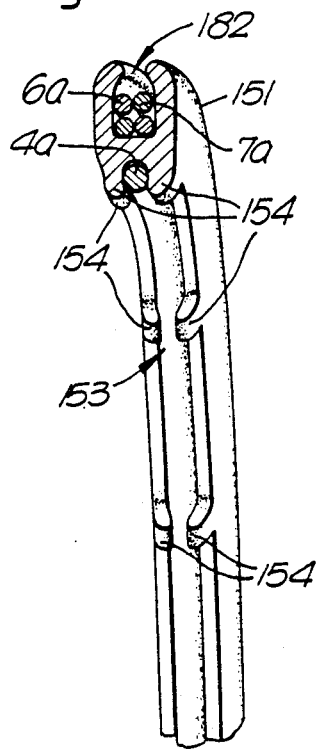
FIG. 3A shows a detail of FIGS. 3, 4, 5 and 6 on a larger scale.

FIG. 3 of the drawings shows this somewhat schematically and FIG. 3A shows a detail of FIG. 3.

Referring to FIG. 3 the repeater housing 1 is shown housing the two bulkheads 2 and 3. Bulkhead 2 is in position in the housing together with the two modular assemblies of FIG. 1 designated generally by the reference numeral 150 and secured to the bulkhead 2 by the clamping ring 95 as described earlier.

Between the pressure chamber of bulkhead 3 and the end of the modular assembly 150 is a 'U'-section resilient fibre carrier 151 part of which is shown in greater detail and on an enlarged scale in FIG. 3A, which in this embodiment is moulded from plastics e.g. Nylon (Trade Mark). Referring to FIG. 3A the U-channel 182 opens outwardly and contains the four (or more) fibres. On the radially inner surface of the carrier is defined a second channel 153 for the power feed conductor 4a and there are clip-like elements 154 which retain the power conductor 4a within the channel 153.

Figure 6:
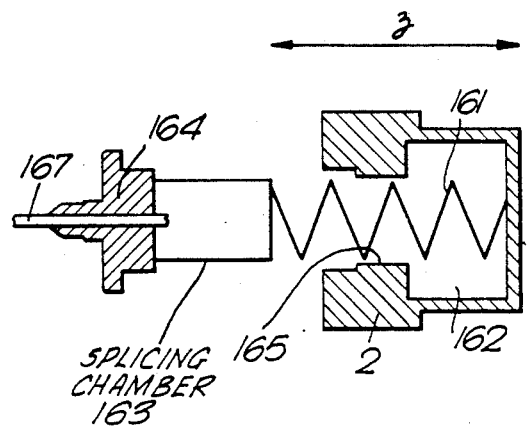
FIG. 6 shows schematically part of the assembly/test procedure associated with the sea cable gland.

The carrier 161 is exactly the same as the carrier 151 except 161 is smaller in overall diameter and is shorter because it only needs to open over the distance "z" shown in FIG. 6 which is similar to the distance "x" but much shorter than the distance "y".

In the U-section channel 182 of the carrier 151 are located four optical fibres, two of which (6a and 7a) are shown in FIG. 1 for modular assemblies 20, 60 and 70, the other two (not shown in FIG. 1) serving to carry the transmission signals to and from the modular assembly 100.

Figure 4:
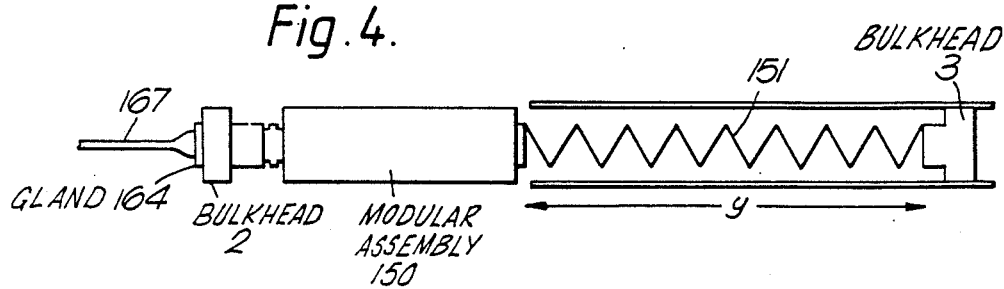
FIG. 4 shows schematically another aspect of the assembly/test procedure.

The U-section carrier 151 enables the modular assemblies attached to the bulkhead 2 to be mounted within the casing 1 as shown in FIG. 3 while the bulkhead 3 is out of the casing. The fibres from the 'B' end of the modular assemblies can be withdrawn from the casing and secured via the glands into the 'B' end bulkhead pressure chamber. This carrier 151 can stretch over the distance "x" to allow this procedure. Furthermore after the basic assembly has taken place and the bulkhead 3 is sealed to the casing 1, it may be desired to remove bulkhead 2 and expose the whole modular assembly from the 'A' end as illustrated in FIG. 4, for e.g. testing purposes. The U-section carrier will enable this to be done by stretching elastically over the distance "y" whilst allowing full optical and power connection through bulkhead 3 to be maintained, therebey enabling testing to be carried out.

Figure 5:
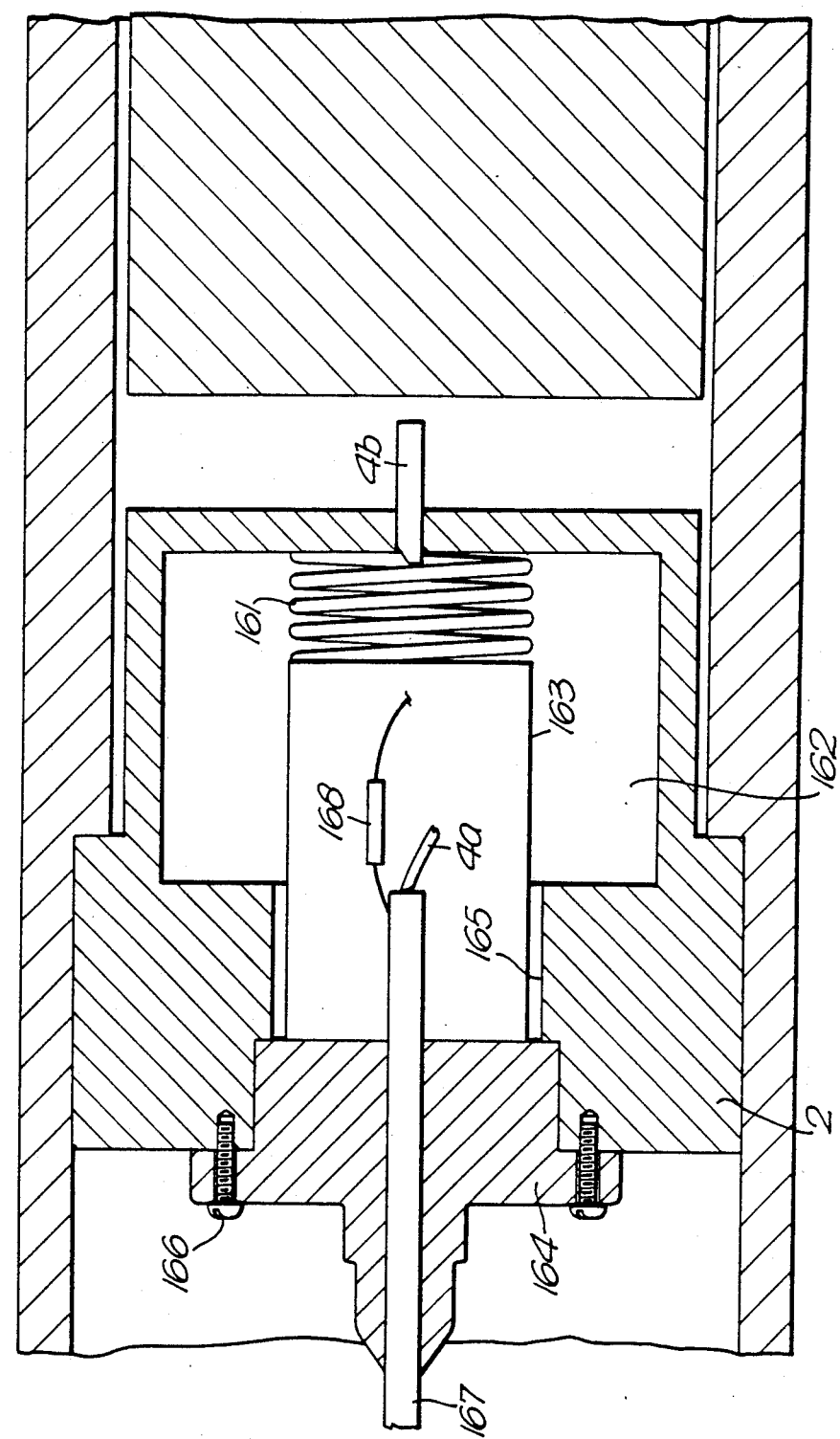
FIG. 5 shows schematically and on a larger scale one end of the repeater of FIG. 1.

In addition within each pressure chamber at the "A" and at the "B" end are located respective second and third U-section carriers of smaller diameter than the carrier 151. One of these is shown in FIG. 5 and designated 161 located in the pressure chamber 162 of the bulkhead 2. This carrier is secured at one end of a splicing chamber 163 carried on the back of the cable gland 164. The gland 164 is removably secured in the central aperture 165 of the bulkhead 2 by screws such as 166. The diameter of the aperture 165 is slightly larger than the outer diameter of the carrier 162 so that the gland with the carrier attached can be assembled or removed and fibre splicing can be carried out to splice e.g. at 168 the fibres of the tail cable 167 to the fibres 6 and 7 coupled to the laser and the photodiode. Thus the carrier 161 extends elastically so that the splice chamber can be withdrawn through the aperture 165 to a location outside the bulkhead as shown in FIG. 6. When splicing is complete the gland is returned and the coils of the spring-like carrier 161 close up. The diameter of the aperture 165 is large enough to allow the minimum bending radius of the fibre in the carrier 161 not to be exceeded (in the negative sense).

We claim:

1. A digital signal repeater for a submerged optical transmission system having a pair of optical fibres for providing signal transmission in respective opposite directions along the system, said repeater comprising:
   an outer sealed submersible housing;
   for each fibre of the pair an independently-sealed regenerator module having electronic and optoelectronic components for regenerating the signal in the fibre;
   a further independently-sealed power module arranged to provide a power feed for each regenerator module; and
   a hermetically sealed semiconductor laser package sealed through a wall of the regenerator module for transmitting the regenerated signal to the fibre.

2. A digital signal repeater for a submerged optical transmission system having a pair of optical fibres for providing signal transmission in respective opposite directions along the system, said repeater comprising:
   an outer sealed submersible housing;
   for each fibre of the pair an independently-sealed regenerator module having electronic and optoelectronic components for regenerating the signal in the fibre;
   a further independently-sealed power module arranged to provide a power feed for each regenerator module;
   spaces defined between a module and the internal surface of the housing in which optical conductors and electrical conductors are disposed for carrying optical and electrical signals to and from the modules; and
   input optical conductors disposed within one of said spaces, output optical conductors disposed within an other of said spaces, said one and said other spaces being diametrically opposed across the housing.

* * * * *